United States Patent
Choate et al.

(10) Patent No.: US 11,015,733 B2
(45) Date of Patent: May 25, 2021

(54) NO-BOLT LATCHING SYSTEM

(71) Applicant: GE Oil & Gas Pressure Control LP, Houston, TX (US)

(72) Inventors: Jeremy Ryan Choate, Houston, TX (US); Travis Kyle McEvoy, Houston, TX (US); Lloyd Cheatham, Lake Jackson, TX (US); Keith M Adams, Katy, TX (US); Robert Law, Houston, TX (US)

(73) Assignee: GE Oil & Gas Pressure Control LP, Houston, TX (US)

( * ) Notice: Subject to any disclaimer, the term of this patent is extended or adjusted under 35 U.S.C. 154(b) by 31 days.

(21) Appl. No.: 16/288,483

(22) Filed: Feb. 28, 2019

(65) Prior Publication Data

US 2019/0195386 A1 Jun. 27, 2019

Related U.S. Application Data

(63) Continuation-in-part of application No. 16/158,490, filed on Oct. 12, 2018, which is a continuation of
(Continued)

(51) Int. Cl.
*F16K 31/122* (2006.01)
*F16L 37/252* (2006.01)
(Continued)

(52) U.S. Cl.
CPC .......... *F16K 31/1228* (2013.01); *E21B 34/08* (2013.01); *F16K 27/00* (2013.01);
(Continued)

(58) Field of Classification Search
CPC ......... Y10T 137/7131; Y10T 137/7256; Y10T 137/7225; Y10T 137/5983; Y10T 137/599;
(Continued)

(56) References Cited

U.S. PATENT DOCUMENTS 2,610,820 A 9/1952 Markel
2,935,166 A 9/1960 Carlson, Jr.
(Continued)

FOREIGN PATENT DOCUMENTS

CN 2121592 11/1992
CN 101093034 12/2007
(Continued)

OTHER PUBLICATIONS

PCT International Preliminary Report on Patentability issued in connection with corresponding PCT Application No. PCT/US2016/036328 dated Dec. 21, 2017.
(Continued)

*Primary Examiner* — Matthew W Jellett
(74) *Attorney, Agent, or Firm* — Hogan Lovells US LLP

(57) ABSTRACT

A system includes an actuator housing having a plurality of adapter lugs extending radially inward toward an axis, each adapter lug of the plurality of adapter lugs secured to the housing via a respective connector. The system also includes a bonnet having a plurality of bonnet lugs extending radially outward away from the axis, each bonnet lug of the plurality of bonnet lugs being separated by a respective space, the space being sized to permit axial movement of an adapter lug of the plurality of adapter lugs toward a lower flange arranged axially lower than the plurality of bonnet lugs.

18 Claims, 11 Drawing Sheets

Related U.S. Application Data application No. 15/175,122, filed on Jun. 7, 2016, now Pat. No. 10,132,422, which is a continuation-in-part of application No. 14/949,324, filed on Nov. 23, 2015, now Pat. No. 9,759,240, which is a continuation-in-part of application No. 13/832,884, filed on Mar. 15, 2013, now Pat. No. 9,212,758.

(60) Provisional application No. 62/172,544, filed on Jun. 8, 2015, provisional application No. 61/747,479, filed on Dec. 31, 2012.

(51) Int. Cl.
*E21B 34/08* (2006.01)
*F16K 27/00* (2006.01)
*F16K 37/00* (2006.01)
*F16K 35/06* (2006.01)
*F16L 29/00* (2006.01)
*F16K 35/08* (2006.01)
*F16K 31/126* (2006.01)

(52) U.S. Cl.
CPC .......... *F16K 31/1221* (2013.01); *F16K 35/06* (2013.01); *F16K 37/0008* (2013.01); *F16L 29/00* (2013.01); *F16L 37/252* (2013.01); *F16K 31/1262* (2013.01); *F16K 35/08* (2013.01); *Y10T 137/599* (2015.04); *Y10T 137/5983* (2015.04); *Y10T 137/6065* (2015.04); *Y10T 137/7131* (2015.04); *Y10T 137/7225* (2015.04); *Y10T 137/7256* (2015.04)

(58) Field of Classification Search
CPC ............ Y10T 137/6065; F16K 15/063; F16K 15/026; F16K 15/025; F16K 17/04; F16K 27/00; F16K 27/0209; F16K 31/1221; F16K 31/1262; F16K 31/1228; E21B 34/08; F16L 29/00; F16L 37/252
See application file for complete search history.

(56) References Cited

U.S. PATENT DOCUMENTS

| | | | |
|---|---|---|---|
| 3,082,792 A | 3/1963 | Jenkins | |
| 3,115,068 A | 12/1963 | Lofink | |
| 3,139,898 A | 7/1964 | Wiltgen | |
| 3,146,682 A | 9/1964 | Price et al. | |
| 3,175,473 A | 3/1965 | Boteler et al. | |
| 3,293,992 A | 12/1966 | Baumann | |
| 3,380,470 A | 4/1968 | Culpepper, Jr. et al. | |
| 3,593,959 A | 7/1971 | Greene | |
| 3,792,717 A | 2/1974 | Tibbals | |
| 3,811,457 A | 5/1974 | Crossman | |
| 3,882,400 A | 5/1975 | Lewis | |
| 3,955,793 A | 5/1976 | Burkhardt et al. | |
| 3,958,592 A | 5/1976 | Wells | |
| 3,993,284 A | 11/1976 | Lukens, Jr. | |
| 4,135,546 A | 1/1979 | Morrison | |
| 4,135,547 A | 1/1979 | Akkerman | |
| 4,187,764 A | 2/1980 | Cho | |
| 4,274,432 A | 6/1981 | Tunstall et al. | |
| 4,309,022 A | 1/1982 | Reinicket et al. | |
| 4,354,425 A | 10/1982 | Bruton et al. | |
| 4,424,738 A | 1/1984 | Leighton | |
| 4,480,811 A | 11/1984 | Card et al. | |
| 4,489,756 A | 12/1984 | Balz | |
| 4,491,060 A | 1/1985 | Boski | |
| 4,527,769 A | 7/1985 | Stogner et al. | |
| 4,529,330 A | 7/1985 | Boski | |
| 4,585,207 A | 4/1986 | Shelton | |
| 4,620,562 A | 11/1986 | Pacht | |
| 4,624,442 A | 11/1986 | Duffy et al. | |
| 4,633,898 A | 1/1987 | Denk | |
| 4,650,151 A | 3/1987 | McIntyre | |
| 4,721,284 A | 1/1988 | Bankard | |
| 4,768,545 A | 9/1988 | Hoffman | |
| 4,871,143 A | 10/1989 | Baker | |
| 4,934,403 A | 6/1990 | Mooney et al. | |
| 4,967,785 A | 11/1990 | Young | |
| 5,067,392 A | 11/1991 | Gautier | |
| 5,294,090 A | 3/1994 | Winnike | |
| 5,464,040 A | 11/1995 | Johnson | |
| 5,499,648 A | 3/1996 | Powell et al. | |
| 5,904,302 A * | 5/1999 | Brown | B64F 1/28 137/614.06 |
| 5,964,446 A | 10/1999 | Walton et al. | |
| 6,015,134 A | 1/2000 | Johnson | |
| 6,041,804 A | 3/2000 | Chatufale | |
| 6,050,541 A | 4/2000 | Chatufale | |
| 6,086,039 A | 7/2000 | Sievers et al. | |
| 6,089,531 A | 7/2000 | Young | |
| 6,397,892 B1 | 6/2002 | Pyle et al. | |
| 6,447,027 B1 * | 9/2002 | Lilley | F16L 37/113 285/148.19 |
| 6,487,960 B1 | 12/2002 | Chatufale | |
| 6,551,030 B1 * | 4/2003 | Curry | E02B 17/0008 405/251 |
| 6,659,419 B2 | 12/2003 | Chatufale | |
| 6,672,331 B2 | 1/2004 | Heald | |
| 6,684,897 B2 | 2/2004 | Sundararajan | |
| 6,854,704 B1 | 2/2005 | Young | |
| 7,117,892 B2 * | 10/2006 | Krywitsky | F16L 37/244 137/614.04 |
| 7,124,774 B2 | 10/2006 | Weingarten | |
| 7,159,839 B2 | 1/2007 | Tanikawa et al. | |
| 7,647,861 B2 | 1/2010 | Bessman | |
| 7,909,365 B2 * | 3/2011 | Krywitsky | F16K 27/07 285/301 |
| 8,282,070 B2 | 10/2012 | Davies, Jr. | |
| 8,322,359 B2 | 12/2012 | Zecchi et al. | |
| 8,522,877 B2 | 9/2013 | Chambers et al. | |
| 8,708,309 B2 | 4/2014 | Roper et al. | |
| 8,864,102 B2 | 10/2014 | Gamache | |
| 8,910,658 B2 | 12/2014 | Adams et al. | |
| 8,991,420 B2 | 3/2015 | Adams et al. | |
| 8,998,166 B2 | 4/2015 | Adams et al. | |
| 9,033,308 B2 | 5/2015 | Kiesbauer et al. | |
| 9,212,758 B2 | 12/2015 | Adams et al. | |
| 9,422,788 B2 | 8/2016 | Nguyen et al. | |
| 9,568,117 B2 | 2/2017 | Adams et al. | |
| 9,759,240 B2 | 9/2017 | McEvoy et al. | |
| 2002/0175303 A1 | 11/2002 | Chatufale | |
| 2003/0034465 A1 | 2/2003 | Adams et al. | |
| 2004/0007682 A1 | 8/2004 | Engle et al. | |
| 2005/0087712 A1 | 4/2005 | Lymberopoulos | |
| 2007/0290154 A1 | 12/2007 | Aoyama | |
| 2011/0240126 A1 | 10/2011 | Lymberopoulos et al. | |
| 2012/0227983 A1 | 9/2012 | Lymberopoulos et al. | |
| 2012/0318388 A1 | 12/2012 | Du | |
| 2014/0138564 A1 | 5/2014 | Adams et al. | |
| 2014/0174554 A1 | 6/2014 | Meyberg et al. | |
| 2015/0204456 A1 | 7/2015 | Adams et al. | |
| 2016/0186527 A1 | 6/2016 | Cocker, III | |
| 2016/0327179 A1 | 11/2016 | Luciotti et al. | |

FOREIGN PATENT DOCUMENTS

| | | |
|---|---|---|
| CN | 202302237 | 7/2012 |
| CN | 202432085 | 9/2012 |
| CN | 205806614 | 12/2016 |
| DE | 102011015646 | 10/2012 |
| EP | 0416966 | 3/1991 |
| EP | 0486824 | 5/1992 |
| FR | 1195213 | 11/1959 |
| GB | 1148817 | 4/1969 |
| GB | 2022704 | 12/1979 |
| GB | 2168787 | 6/1986 |
| GB | 2303199 | 2/1997 |
| JP | 2008069795 | 3/2008 |
| JP | 2010048271 | 3/2010 |
| WO | 2014099505 | 6/2014 |

(56) References Cited

FOREIGN PATENT DOCUMENTS

OTHER PUBLICATIONS

Actuators Pressure Control CHA Top Access Standard Hydraulic Actuator, GE Oil & Gas, 2013.
International Search Report and Written Opinion issued in connection with related PCT Application No. PCT/US2013/067666, dated Mar. 3, 2014.
International Search Report and Written Opinion issued in connection with related PCT Application No. PCT/US13/077392, dated Mar. 7, 2014.
Non-Final Rejection towards related U.S. Appl. No. 13/679,553 dated Mar. 28, 2014.
International Search Report and Written Opinion issued in connection with related PCT Application No. PCT/US2013/074223 dated Apr. 3, 2014.
Non-Final Rejection towards related U.S. Appl. No. 13/717,073 dated Jul. 31, 2014.
Non-Final Rejection towards related U.S. Appl. No. 14/107,589 dated Aug. 13, 2014.
Final Rejection towards related U.S. Appl. No. 13/679,553 dated Oct. 17, 2014.
Notice of Allowance issued in connection with related U.S. Appl. No. 13/679,553 dated Nov. 21, 2014.
Non-Final Rejection towards related U.S. Appl. No. 14/673,178 dated Jul. 30, 2015.
International Search Report and Written Opinion issued in connection with related PCT Application No. PCT/US2015/49556, dated Nov. 19, 2015.
Actuators NoBolt Dual Seal Pneumatic Actuator, GE Oil & Gas, 2015.
Office Action issued in connection with related CN Application No. 201380070284.5 dated May 25, 2016.
Office Action issued in connection with related CN Application No. 201380074076.2 dated Jun. 30, 2016.
Office Action issued in connection with related CN Application No. 201380070678.0 dated Jul. 5, 2016.
Non-Final Rejection towards related U.S. Appl. No. 14/673,178 dated Jul. 15, 2016.
PCT Search Report and Written Opinion for related application PCT/US2013/077412 dated Mar. 7, 2014.
U.S. Appl. No. 62/172,544, filed Jun. 8, 2015.
"Xmas tree installation," Wipertrip.com Drilling and Well Engineering Resources, http://wipertrip.com/completion/operations/80-xmas-tree-installation.html, 5 pages.

* cited by examiner

NO-BOLT LATCHING SYSTEM

CROSS REFERENCE TO RELATED APPLICATIONS

This application is a continuation-in-part of co-pending U.S. patent application Ser. No. 16/158,490 filed Oct. 12, 2018 titled "COMPOUND EXPRESS ACTUATOR CONNECTION," which is a continuation of U.S. patent application Ser. No. 15/175,122, now U.S. Pat. No. 10,132,422, filed Jun. 7, 2016 titled "COMPOUND EXPRESS ACTUATOR CONNECTION," which claims priority to U.S. Provisional Application No. 62/172,544 filed Jun. 8, 2015 titled "Compound Express Actuator Connection," and which is a continuation-in-part of U.S. patent application Ser. No. 14/949,324, now U.S. Pat. No. 9,759,240, filed Nov. 23, 2015 titled "No-Bolt Security Latching System," which is a continuation in part of U.S. application Ser. No. 13/832,884, now U.S. Pat. No. 9,212,758, titled "Quick Connect Valve Actuator," filed Mar. 15, 2013, which claims priority to U.S. Provisional Patent Application No. 61/747,479, titled "Quick Connect Valve Actuator," filed on Dec. 31, 2012, the disclosure of each which is incorporated herein by reference in its entirety.

BACKGROUND OF THE DISCLOSURE

1. Field of the Disclosure

The present disclosure relates in general to valves for mineral recovery wells, and in particular to actuators to actuate valves.

2. Brief Description of Related Art

Valves used in hydrocarbon drilling and production operations can be actuated by a valve actuator. The valve actuator can be a pneumatic, piston, or hydraulic type actuator that moves a stem linearly or rotationally, or both linearly and rotationally, to open or close the valve. A bonnet is connected to the valve, with the stem extending through the bonnet, and then the actuator is connected to the bonnet. Valve actuators are often connected to the bonnet by threaded connections or by bolts through a flange. Threads are expensive to manufacture and are easily damaged. Threaded connections also have the disadvantage that the inlet of the actuator rotates about the axis of the actuator during installation. If the actuator is fully tightened and the inlet ends up in the wrong location, the operating supply line to the inlet must be moved. In addition, bolts can be tampered with, leading to safety concerns and a risk of theft.

SUMMARY OF THE DISCLOSURE

Applicants recognized the problems noted above herein and conceived and developed embodiments of systems and methods, according to the present disclosure, for wellbore pressure isolation.

In an embodiment a valve assembly coupling system includes an actuator for moving a valve between an open position and a closed position. The actuator includes a housing forming a chamber therein, the housing extending from a first end to a second end. The actuator also includes an actuator assembly at the first end, the actuator assembly translating fluid pressure into a driving force. The actuator further includes a stem coupled to the actuator assembly and extending through the actuator. The actuator also includes an adapter ring coupled to the second end, the adapter ring including a plurality of adapter lugs extending radially inward toward the stem, the adapter lugs being circumferentially distributed about an inner diameter of the adapter ring and including a plurality of spaces between adjacent adapter lugs. The system also includes a bonnet that includes a lower flange. The bonnet also includes a plurality of bonnet lugs positioned axially higher than the lower flange, the plurality of bonnet lugs being circumferentially distributed about a circumference of the bonnet and including a plurality of bonnet spaces between adjacent bonnet lugs. The bonnet further includes a groove between the lower flange and the plurality of bonnet lugs.

In another embodiment a valve assembly coupling system includes an actuator housing having a plurality of adapter lugs extending radially inward toward an axis, each adapter lug of the plurality of adapter lugs secured to the housing via a respective connector. The system also includes a bonnet having a plurality of bonnet lugs extending radially outward away from the axis, each bonnet lug of the plurality of bonnet lugs being separated by a respective space, the space being sized to permit axial movement of an adapter lug of the plurality of adapter lugs toward a lower flange arranged axially lower than the plurality of bonnet lugs.

In an embodiment a method for coupling components of a valve assembly includes aligning an adapter lug, coupled to an actuator housing, with a space formed between a pair of bonnet lugs. The method also includes axially lowering the actuator housing to translate the adapter lug below the pair of bonnet lugs through the space. The method further includes rotating the actuator housing to align the adapter lug with at least one bonnet lug. The method also includes locking the actuator housing in position to block rotation of the actuator housing.

BRIEF DESCRIPTION OF THE DRAWINGS

The present technology will be better understood on reading the following detailed description of non-limiting embodiments thereof, and on examining the accompanying drawings, in which.

DETAILED DESCRIPTION OF THE PREFERRED EMBODIMENT

Figure 1:
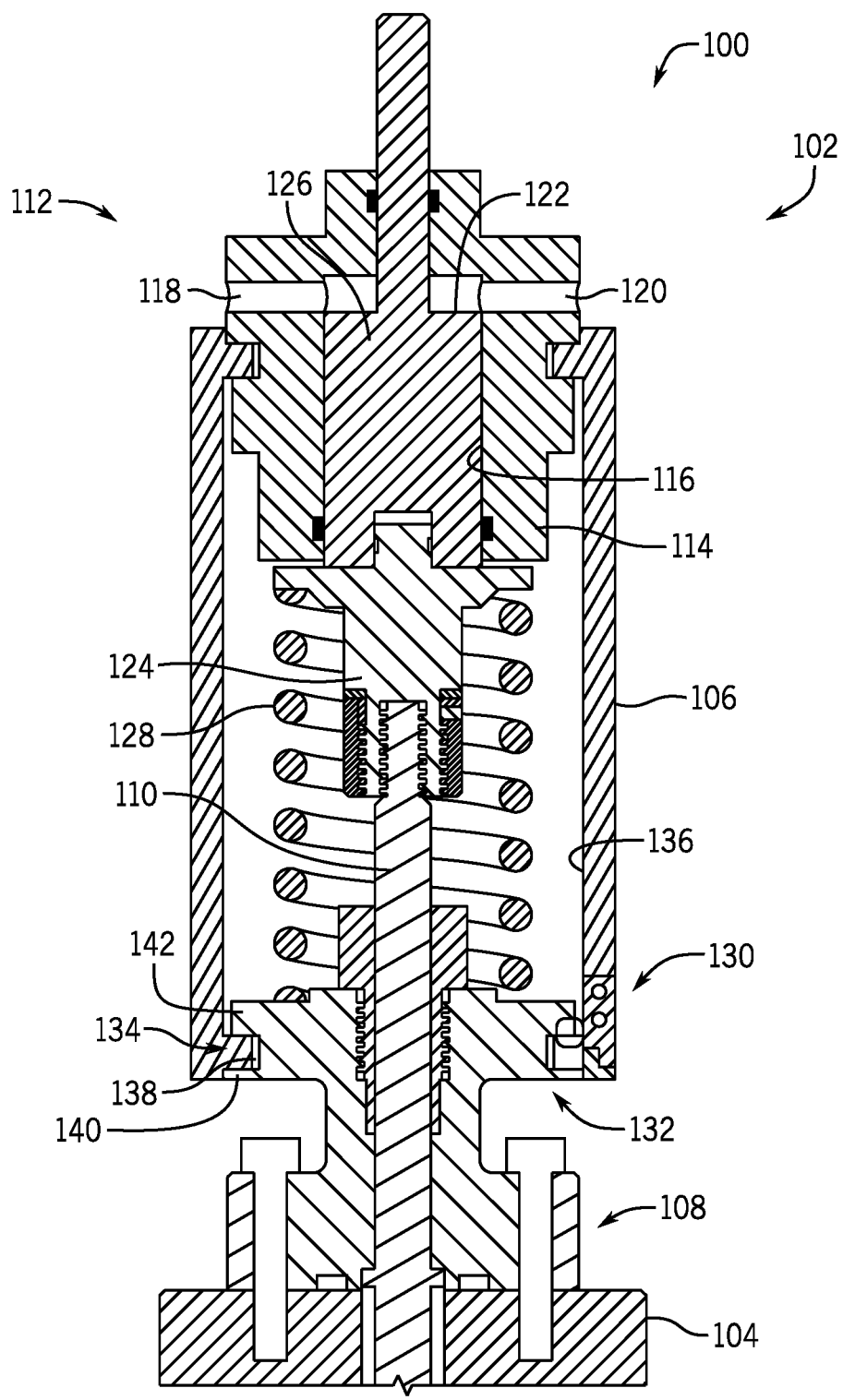
FIG. 1 is a cross-sectional side view of an embodiment of a valve assembly, in accordance with embodiments of the present disclosure.

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

Embodiments of the present disclosure include systems and methods for adapting and/or retrofitting an actuator housing have one or more apertures into a quick connect system. In various embodiments, an adapter ring is coupled to the housing via the existing apertures, for example using connectors such as bolts. The adapter ring may include one or more adapter lugs, which may interact with bonnet lugs to restrict axial movement of the housing relative to the bonnet. In various embodiments, the adapter lugs may be coupled directly to the housing, for example using connectors and the existing apertures. In certain embodiments, a bonnet may be adapted and/or retrofitted to accompany a housing having lugs. A bonnet adapter may be coupled to the bonnet and include one or more outwardly extending bonnet lugs to interact with the housing lugs. In various embodiments, a locking assembly may be utilized to restrict rotational movement of the housing relative to the bonnet. The locking assembly may include a locking lug that interacts with the bonnet lug when in a locked position. Accordingly, actuators and bonnets may be adapted to utilize quick connect features.

FIG. 1 is a cross-sectional side view of an embodiment of a valve assembly 100 including an actuator 102 for actuating a valve 104. It should be appreciated that various features of the valve assembly 100 may not be described for clarity and conciseness. The illustrated actuator 102 is a piston type actuator that may utilize a hydraulic or pneumatic fluid to move the valve between an open position and a closed position. It should be appreciated that while the illustrated embodiment includes a piston type actuator that other actuators may also be utilized. The actuator 102 includes a housing 106 detachably coupled to a bonnet 108. A valve stem 110 extends downward through the housing 106 and actuates the valve 104, for example, via a force applied by the actuator 102. The illustrated piston type actuator 102 includes a piston head 112, which may be referred to as a power head, detachably coupled to the housing 106. The piston head 112 has a cylindrical body 114, in the illustrated embodiment. The piston head 112 further includes ports 118, 120 extending into an opening 122 within the body 114. In various embodiments, the port 118 may be utilized as an inlet port and the port 120 may be utilized as an outlet port. However, it should be appreciated that one or both of the ports 118, 120 may be used as either/or inlets and outlets.

In various embodiments, the valve assembly 100 further includes a downstop 124 in contact with a piston 126 that may reciprocate within the piston chamber 116, thereby driving vertical movement of the valve stem 110 via a connection to a lower end of the downstop 124. That is, pressure applied to the piston 126 is translated to the downstop 124 and to the piston 126. In the illustrated embodiment, the piston 126 applies a downward force. The illustrated spring 128 may be used to urge the valve stem 110 in an opposite direction via an upward force applied to the downstop 124.

The embodiment illustrated in FIG. 1 shows a quick connect type of connection between the housing 106 and the bonnet 108. A lower end 130 of the housing 106, which may be referred to as a valve end, is coupled to an upper end 132 of the bonnet 108 via respective lugs. That is, housing lugs 134 protrude radially inward from an inner diameter 136 of the housing 106 into a groove 138 formed in the bonnet 106 between a lower flange 140 and bonnet lugs 142. As will be described below, each of the housing lugs 134 and the bonnet lugs 142 may include spaces therebetween, thereby enabling axial movement of the housing lugs 134 past the bonnet lugs 142 such that the housing lugs 134 may be arranged within the groove 138. Thereafter, rotational movement of the housing 106 aligns the housing lugs 134 with the bonnet lugs 142 to block axial movement of the housing 106 relative to the bonnet 108.

Figure 2:
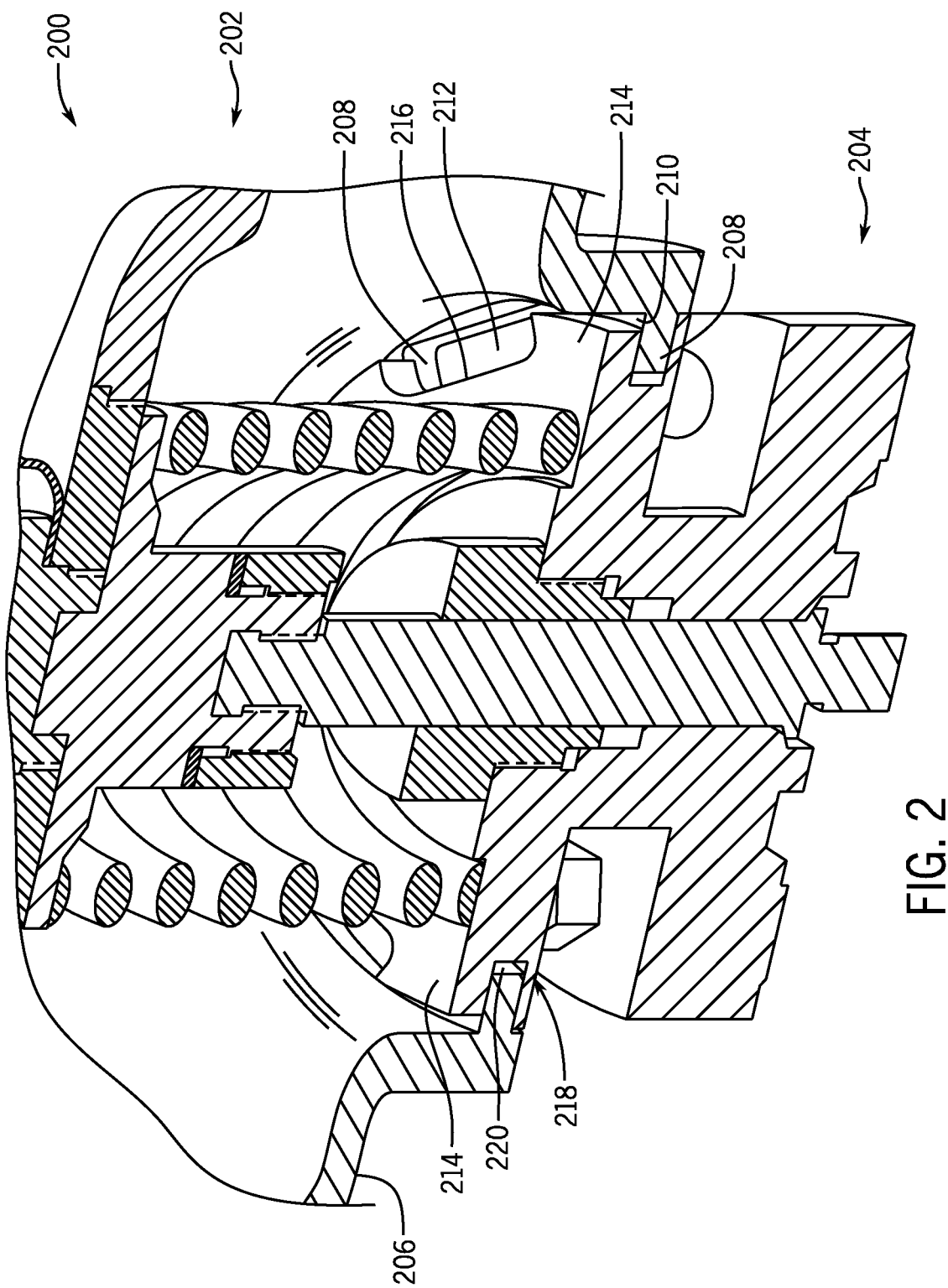
FIG. 2 is an isometric cross-sectional side view of an embodiment of a housing and bonnet coupled together via a quick connect, in accordance with embodiments of the present disclosure.

FIG. 2 is a cross-sectional isometric view of an embodiment of a valve assembly 200 including an actuator 202 coupled to a bonnet 204. The valve assembly 200 may be similar to the valve assembly 100 illustrated in FIG. 1. As described above, an actuator housing 206 includes lugs 208 extending radially inward from an inner diameter 210 of the actuator housing 206. The housing lugs 208 are not continuous, but rather extend a circumferential distance and are separated by a space 212. The space 212 enables installation and removal of the actuator housing 206 with respect to the bonnet 204.

In various embodiments, the bonnet 204 includes bonnet lugs 214 extending a circumferential distance and separated by spaces 216. Moreover, a lower flange 218 is arranged axially lower than the bonnet lugs 214, forming a groove 220 that receives the housing lugs 208. In various embodiments, the housing lugs 208 have a circumferential distance that is less than a circumferential distance of the spaces 216, thereby enabling axial movement of the housing lugs 208 through the spaces 216. Thereafter, the housing lugs 208 may contact the lower flange 218 to secure the housing lugs 208 within the groove 220. In operation, the housing 206 may be rotated to substantially align the housing lugs 208 with the bonnet lugs 214, thereby blocking axial movement of the housing 206 relative to the bonnet 204.

In certain embodiments, it may be advantageous to adapt a previously bolted or threaded housing to interact with the bonnet including the lugs, thereby retrofitting an existing housing into a quick connect type housing. However, this may provide challenges, as the existing housing may include apertures for bolts. Embodiments of the present disclose may include systems or methods for adapting housings with bolt apertures for use with bonnets that include the lugs. Furthermore, in various embodiments, systems and methods may be utilized to adapt a bonnet without lugs to include lugs for use with a housing including lugs, either originally or modified to do so.

Figure 3:
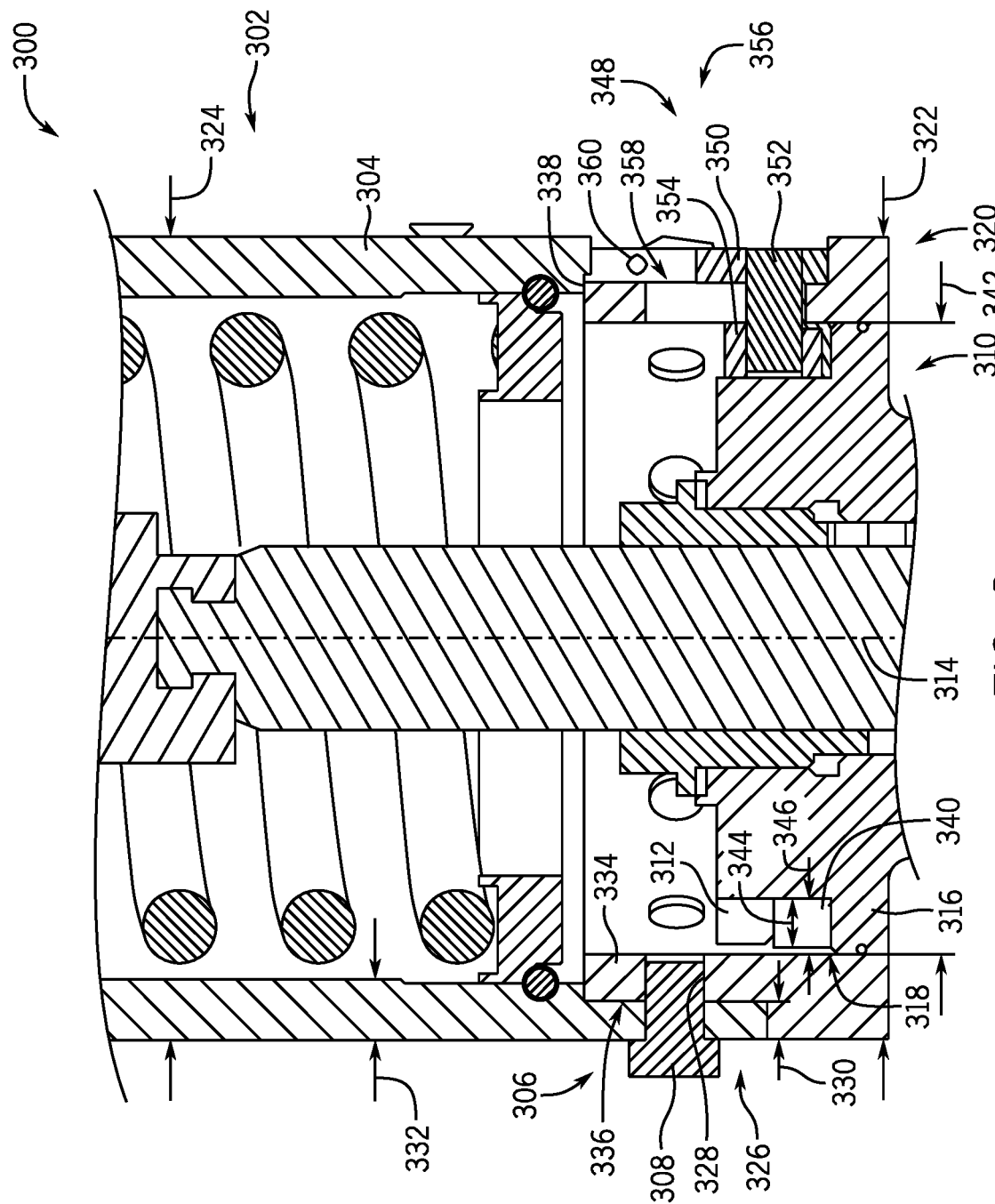
FIG. 3 is a cross-sectional side view of an embodiment of a valve assembly including an adapter ring coupled to a housing, in accordance with embodiments of the present disclosure.

FIG. 3 is a cross-sectional side view of an embodiment of a valve assembly 300. In the illustrated embodiment, an actuator 302 includes an actuator housing 304. In various embodiments, the actuator housing 304 includes apertures 306 for receiving one or more bolts 308, which are used as an example only and various other connections may also be used. It should be appreciated that the apertures 306 may be circumferentially spaced about the actuator housing 304. The actuator housing 304 may traditionally bolt directly to a bonnet 310. However, the illustrated bonnet 310 includes bonnet lugs 312, thereby enabling a quick connection coupling between the actuator 302 and the bonnet 310.

As described above, in various embodiments the bonnet lugs 312 may be arranged circumferentially about the bonnet 310 and extend radially outward with respect to an axis 314. The illustrated bonnet lugs 312 are arranged axially higher than a lower flange 316, which forms a groove 318 between the bonnet lugs 312 and the lower flange 316. As will be described below, actuator lugs may be axially arranged within the groove 318 and aligned with the bonnet lugs 312 to block axial movement of the housing 304 relative to the bonnet 310.

In various embodiments, the housing 304 may be adapted from a traditional bolted housing to a quick connection housing via an adapter ring 320. For example, the illustrated adapter ring 320 includes an outer diameter 322 that is substantially equal to an outer diameter 324 of the housing 304. A lower end 326 of the housing 304 lands on a shoulder 328 of the adapter ring 320, in the illustrated embodiment. As shown, a width 330 of the shoulder 328 is substantially equal to thickness 332 of the housing, thereby forming a substantially continuous outer profile.

A mating extension 334 extends axially away from the shoulder 328 and includes an aperture 336 that aligns with the aperture 306 of the housing 304, thereby enabling the bolt 308 to couple the housing 304 to the adapter ring 320. It should be appreciated that a plurality of apertures 336 may be arranged circumferentially about the adapter ring 320 to align with each aperture 306 of the housing 304. However, in other embodiments, there may be more or fewer apertures 336, 306. In the illustrated embodiment, a lip 338 of the housing 304 blocks movement of the adapter ring 320 via contact with the mating extension 334, thereby facilitating alignment of the apertures 306, 336.

The illustrated adapter ring 320 includes adapter lugs 340, which act similarly to the actuator lugs discussed herein. The adapter lugs 340 may have a circumferential length that does not extend continuously about a circumference of the adapter ring 320. That is, the adapter lugs 340 may be segmented and separated by spaces (not pictured) to enable axial movement of the adapter lugs 340 through the spaces between the bonnet lugs 312 to arrange the adapter lugs 340 within the groove 318. In various embodiments the adapter lugs 340 extend radially inward from an inner diameter 342 of the adapter ring 320 toward the axis 314. In the illustrated embodiment, the adapter lugs 340 have an axial length 344 that is substantially equal or smaller than an axial length 346 of the groove 318. As a result, rotation of the adapter ring 320 may move the adapter lugs 340 within the groove 318 to enable alignment of the adapter lugs 340 and the bonnet lugs 312 to block axial movement of the housing 304 with respect to the bonnet 310.

Further illustrated in FIG. 3 is a locking assembly 348. The locking assembly 348 may be utilized to prevent rotation of the housing 304 when in a locked position (shown in FIG. 3) and to enable rotation when in an unlocked position (not pictured). In the illustrated embodiment, a translating latch 350 is coupled to a shaft 352 that extends to a locking lug 354. In the illustrated locked position, the locking lug 354 may contact the bonnet lug 312 when a rotational force is applied to the housing 304, thereby blocking rotation of the housing. As illustrated, the latch 350 is arranged within a cutout section 356 formed at least partially in the housing 304 and the adapter ring 320. However, it should be appreciated that the cutout section 356 may be entirely in the adapter ringer 320 or entirely in the housing 304, based on design conditions. The adapter ring 320 further includes an opening 358 that is substantially aligned within the cutout section 356, thereby enabling movement of the shaft 352 as the latch 350 is axially translated within the cutout section 356. The illustrated cutout section 356 further includes a pinhole 360, which may include a pin, such as a spring-loaded pin or the like, that holes the latch 350 in the unlocked position.

In various embodiments, the adapter ring 320 may be coupled to the housing 304 using existing apertures 306 formed within the housing 304. These existing apertures may be bolt holes utilized to position the adapter lugs 340 at predetermined positions within the housing 304, thereby converting the bolted actuator housing into a quick connect actuator housing. Furthermore, it should be appreciated that, in various embodiments, the existing housing may also be a threaded housing, and an outer diameter of the adapter ring 320 may include threads (e.g., along the mating extension 334) to couple to the housing 304. Furthermore, other coupling mechanisms may also be utilized, such as clamps and the like. Accordingly, the converted actuator housing 304 may be utilized with an existing lugged bonnet 310, thereby enabling retrofitting or modifications to existing equipment.

Figure 4:
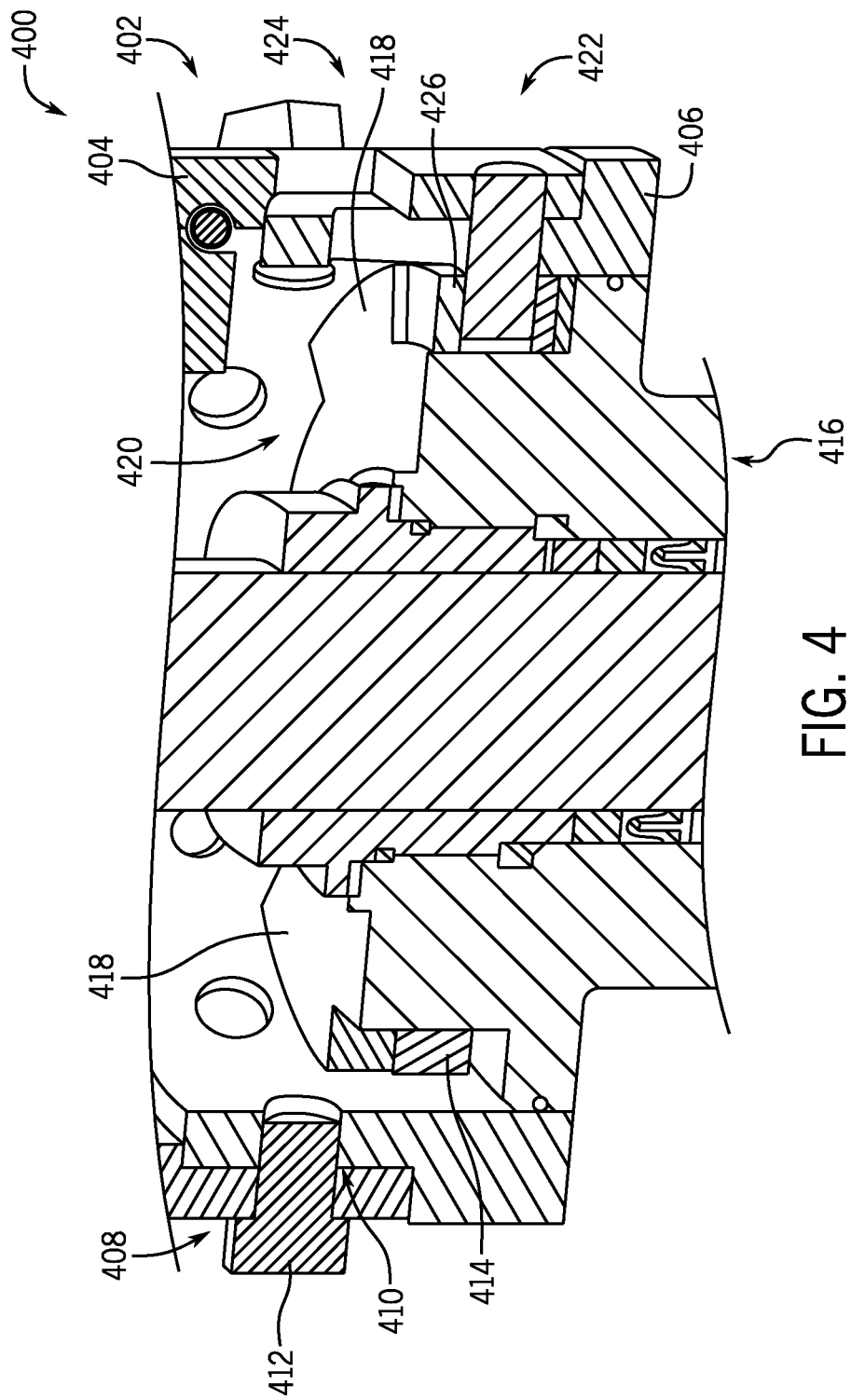
FIG. 4 is an isometric cross-sectional view of an embodiment of a value assembly including an adapter ring coupled to a housing, in accordance with embodiments of the present disclosure.

FIG. 4 is a cross-sectional isometric view of an embodiment of a valve assembly 400. The illustrated valve assembly 400 includes an actuator 402 including an actuator housing 404 coupled to an adapter ring 406. As described above, the actuator housing 404 includes apertures 408 that align with apertures 410 of the adapter ring 406 to secure adapter ring 406 in position via connectors 412, such as bolts. In various embodiments, adapter lugs 414 may also be secured in place with the connectors 412, as will be described herein. However, the illustrated embodiment includes the adapter lugs 414 integrally formed on the adapter ring 406 axially lower than the apertures 408, 410.

As described above, in various embodiments a bonnet 416 includes bonnet lugs 418 that are separated by spaces 420, thereby forming a passage to enable axial movement of the adapter lugs 414 through the spaces 420. Thereafter, rotation of the housing 404 may align the bonnet lugs 418 with the adapter lugs 414 to block axial movement of the housing 404 relative to the bonnet 416.

Furthermore, the illustrated embodiment includes a locking assembly 422 arranged within a cutout 424 formed in the housing 404 and the adapter ring 406. The illustrated locking assembly 422 is in a locked position where a locking lug 426 is aligned with the bonnet lug 418 such that rotational movement of the housing 404 would drive the locking lug 426 into the bonnet lug 418 to prevent rotation. In this manner, the housing 404 may be secured to the bonnet 416.

Figure 5:
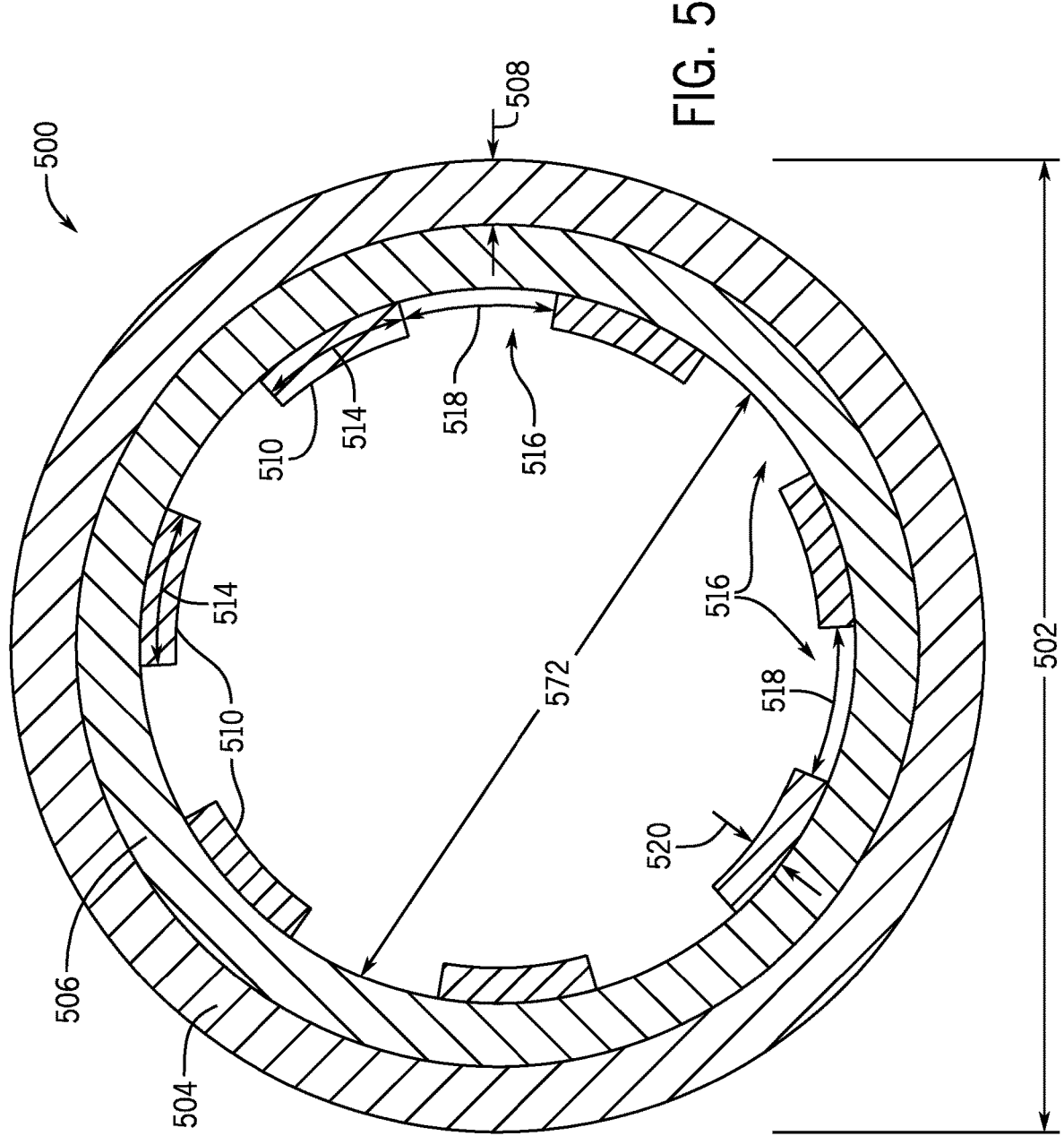
FIG. 5 is a top plan view of an embodiment of an adapter ring, in accordance with embodiments of the present disclosure.

FIG. 5 is a top plan view of an embodiment of an adapter ring 500, which may be utilized to convert a bolted actuator housing into a quick connect housing. The illustrated embodiment includes an annular ring having an outer diameter 502 and includes the shoulder 504, described above, proximate a mating extension 506. The shoulder 504 has a thickness (e.g., radial distance) 508 that may be approximately equal to a thickness of an actuator housing, thereby providing a substantially smooth or even outer profile. However, it should be appreciated that the shoulder 504 may be any reasonable size. The illustrated adapter ring 500 further includes adapter lugs 510 arranged circumferentially about an inner diameter 512 of the adapter ring 500. In the illustrated embodiment, each adapter lug 510 has a circumferential distance 514 (e.g., length). The illustrated adapter lugs 510 have equal lengths 514, however, it should be appreciated that the lengths may be different, based on design conditions. The adapter lugs 510 are separated from adjacent lugs by spaces 516. In various embodiments, a circumferential distance 518 (e.g., length) of the spaces 516 is greater than the lengths 514 of the adapter lugs 510. However, it should be appreciated that the length 518 of the spaces 516 may be approximately equal to the length 514 or smaller than the lengths 514. As described above, the arrangement of the lugs 510 enables axial passage through the spaces between the bonnet lugs, thereby transitioning the lugs 510 into a groove of the bonnet to enable rotation and subsequent alignment of the lugs 510 with the bonnet lugs. The adapter lugs 510 are illustrated as extending a radial distance 520 toward an axis of the adapter ring 500, which may be approximately equal to or less than a radial distance of accompanying bonnet lugs.

Figure 6:
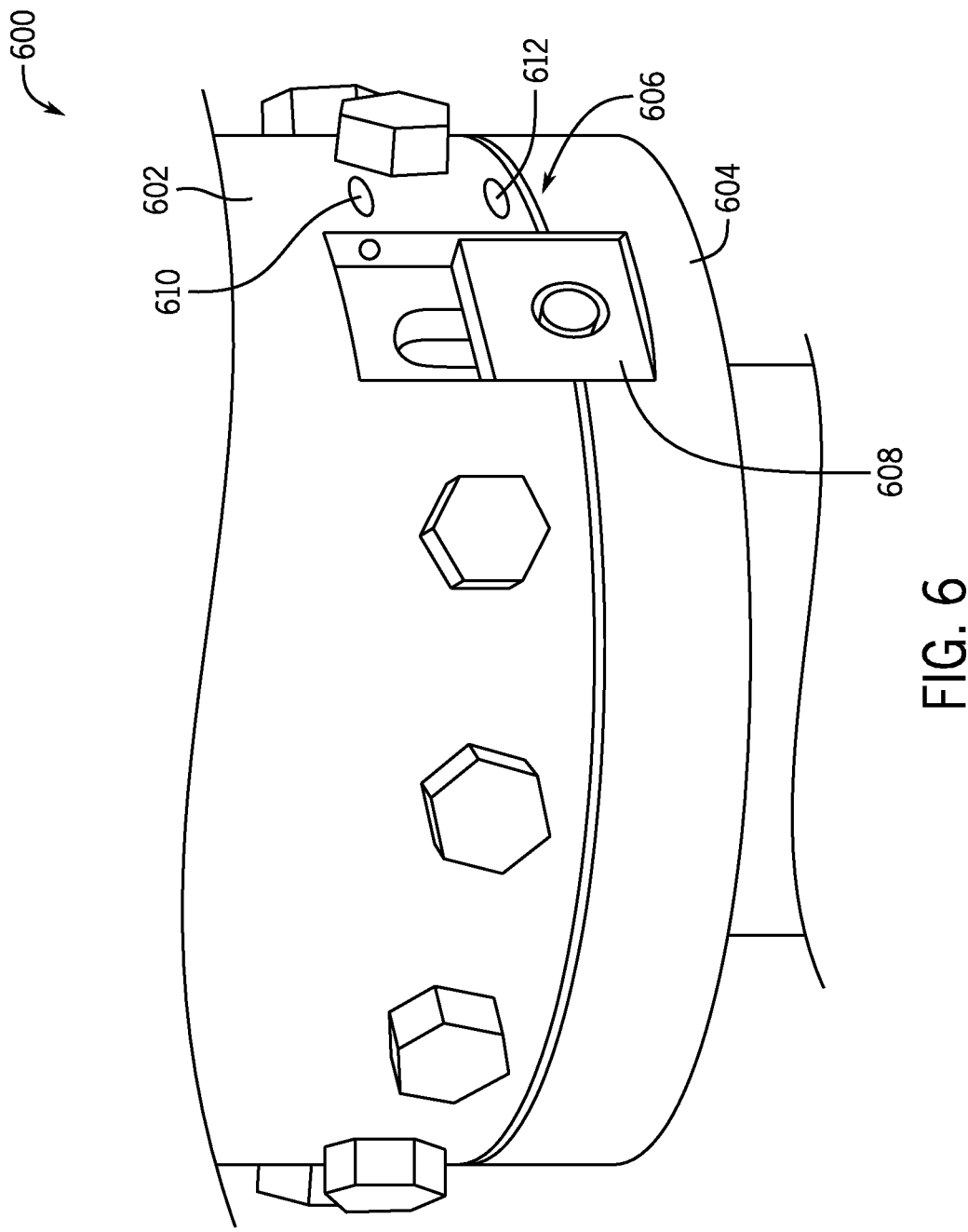
FIG. 6 is an isometric view of an embodiment of a locking assembly of a valve assembly, in accordance with embodiments of the present disclosure.

FIG. 6 is a perspective view of an embodiment of a locking assembly 600 arranged in a locked position. The illustrated embodiment includes a housing 602 coupled to an adapter ring 604, as described above. The illustrated housing 602 and adapter ring 604 include a cutout 606 to enable axial translation of the locking assembly 600. For example, a latch 608 may axially translate within the cutout 606. Furthermore, holes 610, 612 are illustrated, which may contain pins or the like to secure the latch 608 in an unlocked position or a locked position. For example, a pin may extend through hole 610 and engage the latch 608. In various embodiments, specialized tools or the like may be utilized to block inadvertent or unauthorized removal of the pins.

Figure 7:
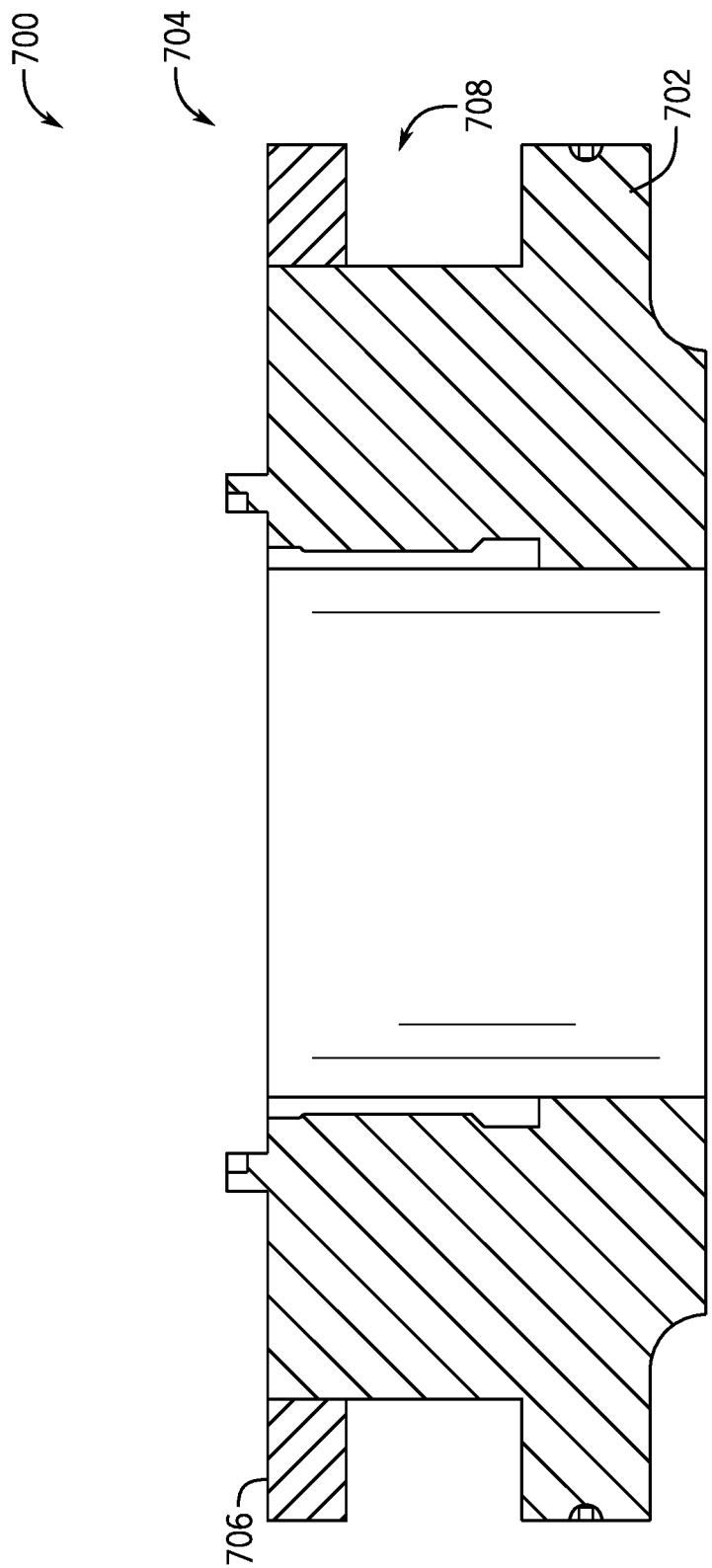
FIG. 7 is a cross-sectional side view of an embodiment of a bonnet including a bonnet adapter, in accordance with embodiments of the present disclosure.

FIG. 7 is a cross-sectional side view of an embodiment of a bonnet 700 including a lower flange 702. In various embodiments, the bonnet 700 may include other features, which have been removed for simplicity with the following discussion. In certain embodiments, the bonnet 700 may be utilized with a valve assembly that may not be designed to operate with a quick connect assembly. As a result, the bonnet 700 may not include bonnet lugs for use with a quick connect housing. Embodiments of the present disclosure include the illustrated bonnet adapter 704, which may couple to the bonnet 700 and convert the bonnet into a quick connect type bonnet. For example, the illustrated bonnet adapter 704 may be threaded or otherwise coupled to the bonnet 700, for example via set screws or the like. The bonnet adapter 704 includes the bonnet lugs 706, which may interact with lugs on the housing to restrict axial movement of the housing. It should be appreciated that the configuration of the bonnet adapter 704 may vary based on design conditions. For example, in certain embodiments the bonnet adapter 704 may screw onto or otherwise couple to a top portion of the bonnet. In other embodiments, the bonnet adapter 704 may include an extension that sits on the lower flange 702. As noted above, the configuration of the bonnet adapter 704 enables formation of a groove 708 between the bonnet lugs 706 and the flange 702, which provides a seating surface for the housing lugs.

Figure 8:
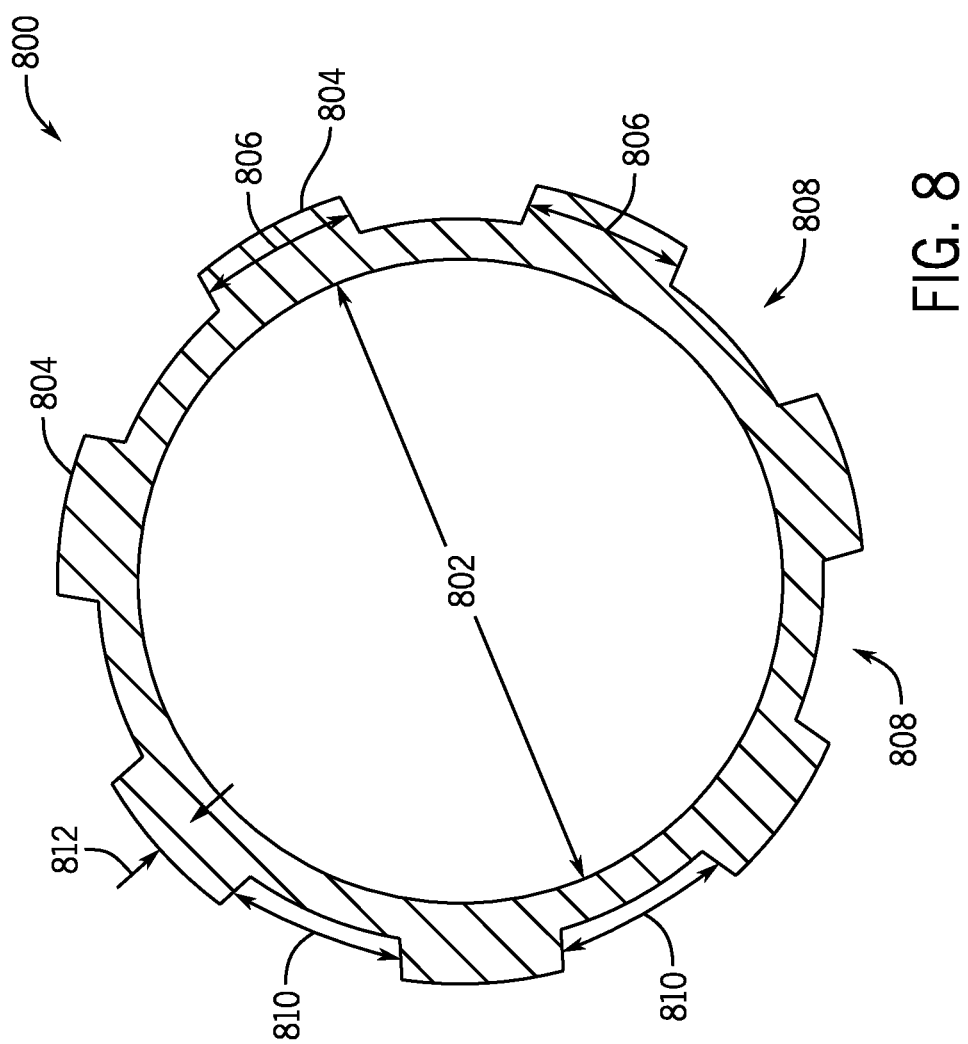
FIG. 8 is a top plan view of an embodiment of a bonnet adapter, in accordance with embodiments of the present disclosure.

FIG. 8 is a top plan view of an embodiment of a bonnet adapter 800, which includes an inner diameter 802 for facilitating connection to a bonnet, such as the bonnet 700. The inner diameter 802 may include threads or the like to coupling to the bonnet 700. However, it should be appreciated that other coupling mechanisms, such as set screws and the like may be utilized. As illustrated in FIG. 8, the bonnet adapter 800 includes bonnet lugs 804 that extend radially outward from the inner diameter 802. Each bonnet lug 804 has a circumferential distance 806 (e.g., length). The illustrated bonnet lugs 804 have equal lengths 806, however, it should be appreciated that the lengths may be different, based on design conditions. The bonnet lugs 804 are separated from adjacent lugs by spaces 808. In various embodiments, a circumferential distance 810 (e.g., length) of the spaces 808 is greater than the lengths 806 of the bonnet lugs 804. However, it should be appreciated that the length 810 of the spaces 808 may be approximately equal to the length 806 or smaller than the length 806. The spaces 808 are formed by the external radial extension of the bonnet lugs 804 by a radial distance 812. As described above, the radial distance 812 may be particularly selected to accommodate features of the housing, such as the adapter lugs.

It should be appreciated that various dimensions of the bonnet adapter 800 may be particularly selected based on the accompanying quick connect housing. For example, it is desirable that a length of the adapter lugs is smaller than or equal to the length 810 of the spaces 808 to enable axial movement of the adapter lugs through the spaces. Moreover, the groove formed between the bonnet lugs 804 and the lower flange may be substantially equal to an axial height of the adapter lugs.

Figure 9:
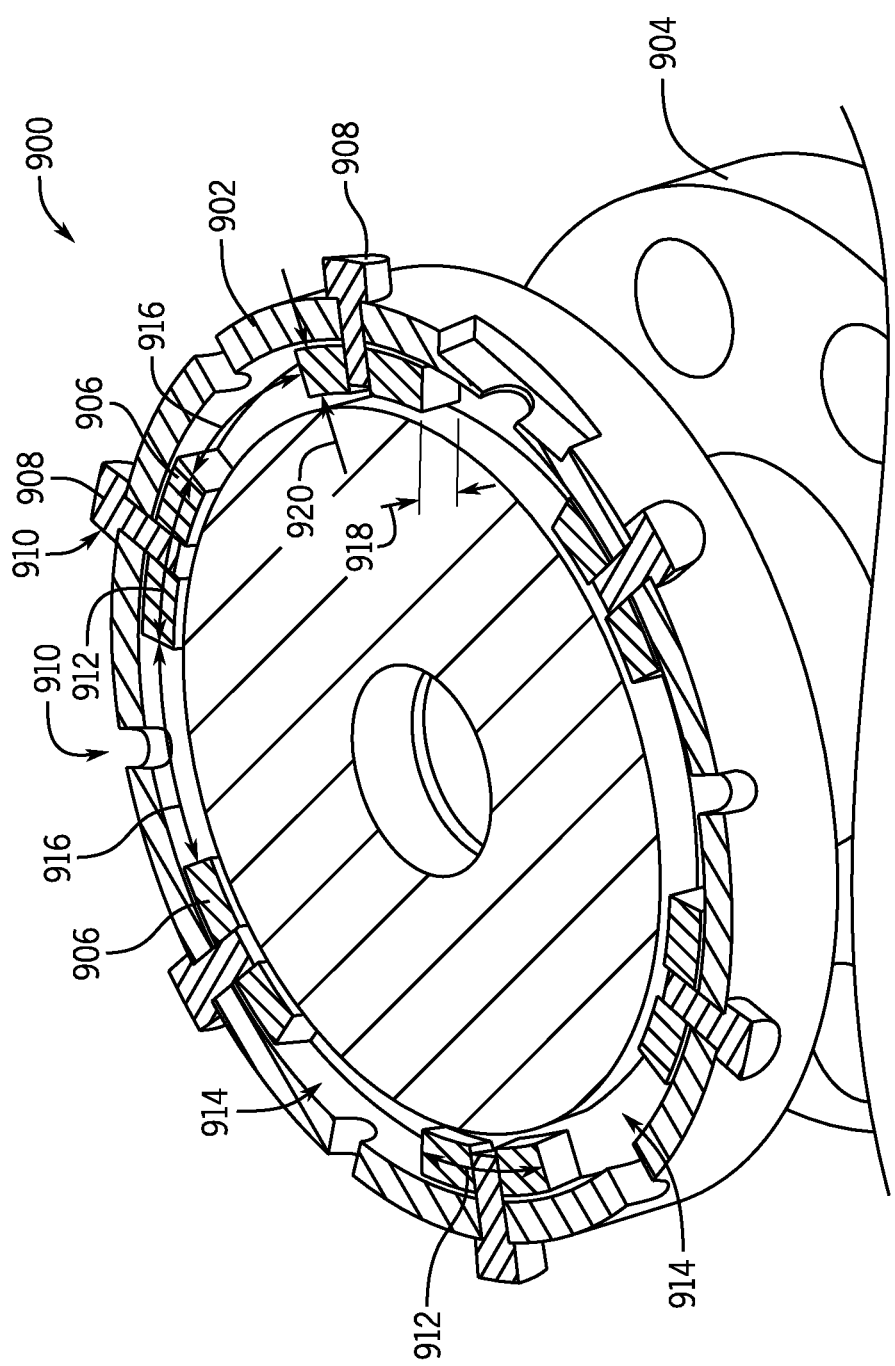
FIG. 9 is a sectional view of an embodiment of housing having adapter lugs arranged on a bonnet, in accordance with embodiments of the present disclosure.

FIG. 9 is a top sectional view of an embodiment of a valve assembly 900. It should be appreciated that various components have been removed for clarity. The illustrated valve assembly 900 includes an actuator housing 902, of which the top has been removed for clarity. The housing actuator 902 is positioned around a bonnet 904, of which the top has been removed for clarity. In the illustrated embodiment, adapter lugs 906 are coupled to the housing 902 via connectors 908 extending through apertures 910 formed in the housing 902. In various embodiments, the apertures 910 are bolt holes for an existing housing that was previously coupled to the bonnet 904 via bolts. In the illustrated embodiment, each aperture 910 is not utilized to secure the adapter lugs 906 to the housing 902. That is, some of the apertures 910 are left unused. As described above, this may be intentional as the adapter lugs 906 may be installed to accommodate the spaces and/or bonnet lugs of the bonnet 904.

The illustrated adapter lugs 906 extend a circumferential distance 912 (e.g., length) and are separated by a space 914 between adjacent adapter lugs 906, which may enable axial travel through spaces between bonnet lugs, as described above. The space 914 has a circumferential distance 916, which may be less than, equal to, or greater than the circumferential distance 914 (e.g., length). In various embodiments, adapter lugs 906 are aligned with spaces in the bonnet to axially translate the adapter lugs 906 into a groove formed between a lower flange and bonnet lugs. The housing may then be rotated to align the adapter lugs 906 with the bonnet lugs to block axial movement of the housing. In various embodiments, the adapter lugs 906 have an axial height 918 and a radial distance 920 that substantially equals or accommodates the groove.

Figure 10A:
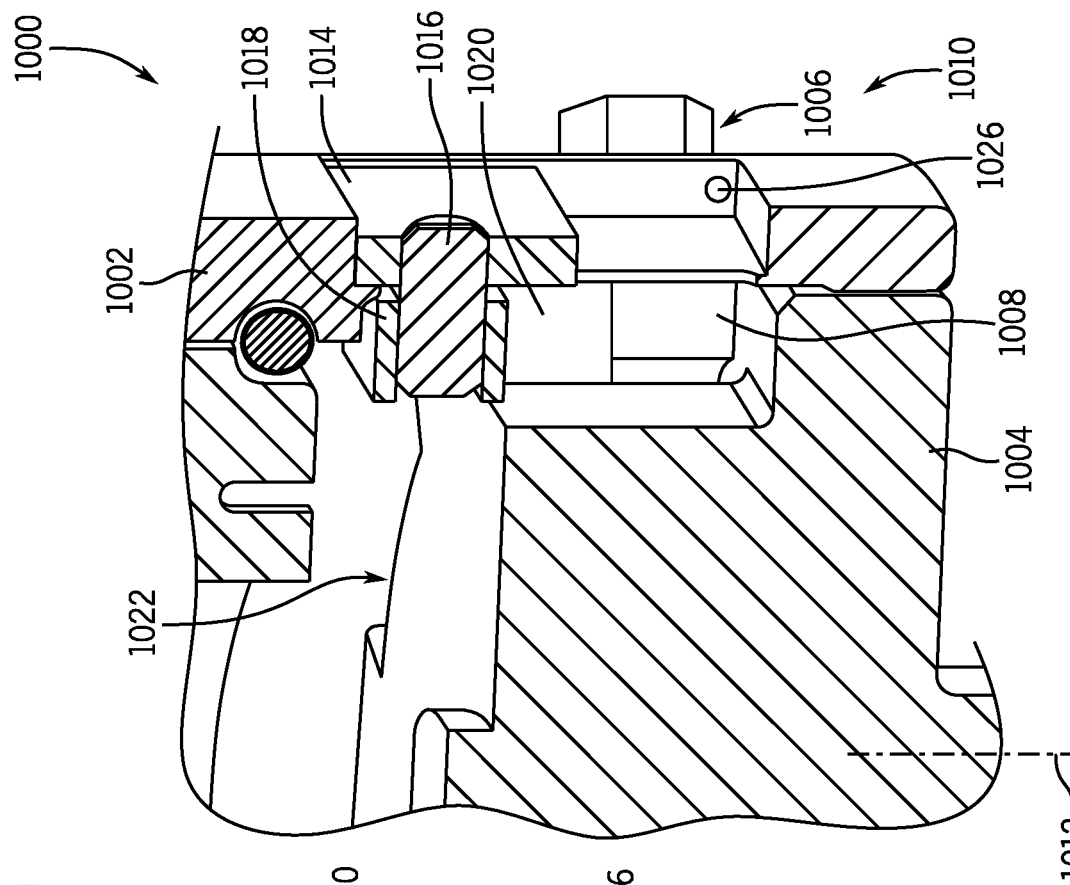
FIG. 10A is an isometric cross-sectional view of an embodiment of a locking assembly in a locked position, in accordance with embodiments of the present disclosure.

FIG. 10A is a detailed cross-sectional perspective view of an embodiment of a locking assembly 1000 blocking rotation between an actuator housing 1002 and a bonnet 1004. The embodiment differs from FIG. 4 in that the adapter ring has been removed and the original apertures 1006 of the housing 1002 are utilized to couple adapter lugs 1008 to the housing 1002, as will be described herein. The illustrated locking assembly 1000 is arranged, at least partially, within a cutout 1010 formed in the housing 1002. The locking assembly 1000 is axially translatable along an axis 1012 to move between a locked position (shown) and an unlocked position (FIG. 10B).

The illustrated locking assembly 1000 includes a latch 1014, a shaft 1016, and a locking lug 1018. The locking lug 1018 moves axially with the latch 1014 between the locked position and the unlocked position. In the illustrated embodiment, the locking lug 1018 is aligned with a bonnet lug 1020 such that rotation of the housing 1002 is blocked via contact between the locking lug 1018 and the bonnet lug 1020. In various embodiments, the locking lug 1018 may also contact the adapter lug 1008. The locking lug 1018 is arranged with a space 1022 arranged between bonnet lugs 1020, as described above. Accordingly, a location of the locking assembly 1000 may be particularly selected to align with space 1022.

The illustrated embodiment further includes a hole 1024 arranged along the cutout 1010. The hole 1024 may receive a pin or the like, which may interact with the latch 1014, for example to a mating hole formed in the latch 1014, to hold the latch 1014 in the unlocked position. Moreover, a similar hole may be arranged to secure the latch 1014 in the illustrated locked position. Accordingly, in various embodiments, the locking assembly 1000 may be utilized to block rotation of the housing 1002 relative to the bonnet 1004.

Figure 10B:
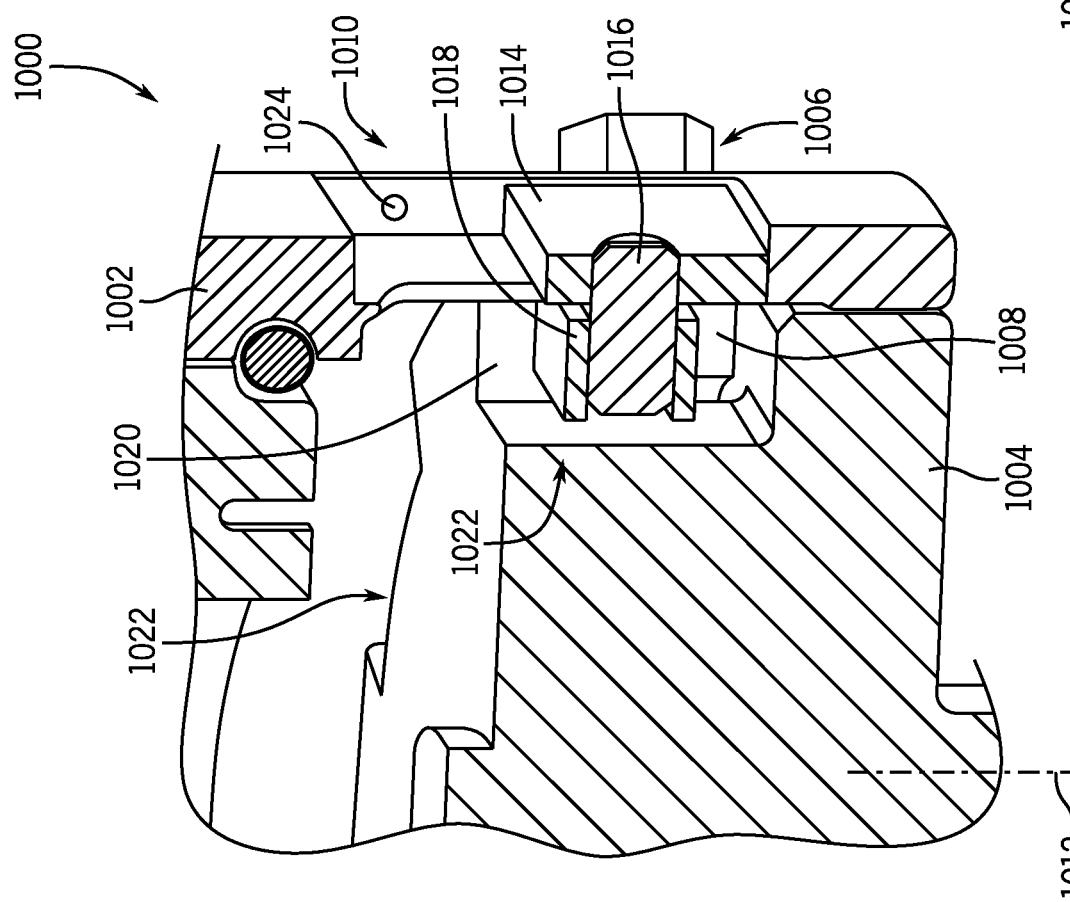
FIG. 10B is an isometric cross-sectional view of an embodiment of a locking assembly in an unlocked position, in accordance with embodiments of the present disclosure.

FIG. 10B is a detailed cross-sectional perspective view of an embodiment of the locking assembly 1000 in the unlocked position. The illustrated embodiment includes the adapter lug 1008 axially aligned with the bonnet lug 1020, thereby blocking axial movement of the housing 1002 relative to the bonnet 1004. However, as illustrated, the locking assembly 1000 arranged in the open or unlocked position enables rotation of the housing 1004 relative to the bonnet 1004. For example, the locking lug 1018 is arranged axially above the bonnet lug 1020, and as a result, rotation of the housing 1004 is enabled. As described above, a hole 1026 may be arranged to enable interaction with the latch 1014, which would lock the latch 1014 in the locked position, as illustrated in FIG. 10A.

It should be appreciated that while the embodiments illustrated in FIGS. 10A and 10B have omitted the adapter ring illustrated in FIGS. 3 and 4, in various embodiments the locking assemblies may interact in a similar manner. That is, the locking assemblies may be considered to be in the locked position when rotation is blocked via interaction between the locking lugs and the bonnet lugs. Moreover, in various embodiments, the locking assemblies may be considered to be in the unlocked position when the locking lugs are arranged axially higher than the bonnet lugs. For example, the cutout may be configured such that the locking assemblies may be positioned vertically higher than the bonnet lugs, such that rotation of the housing will not lead to interference between the blocking lug and the bonnet lugs.

Figure 11:
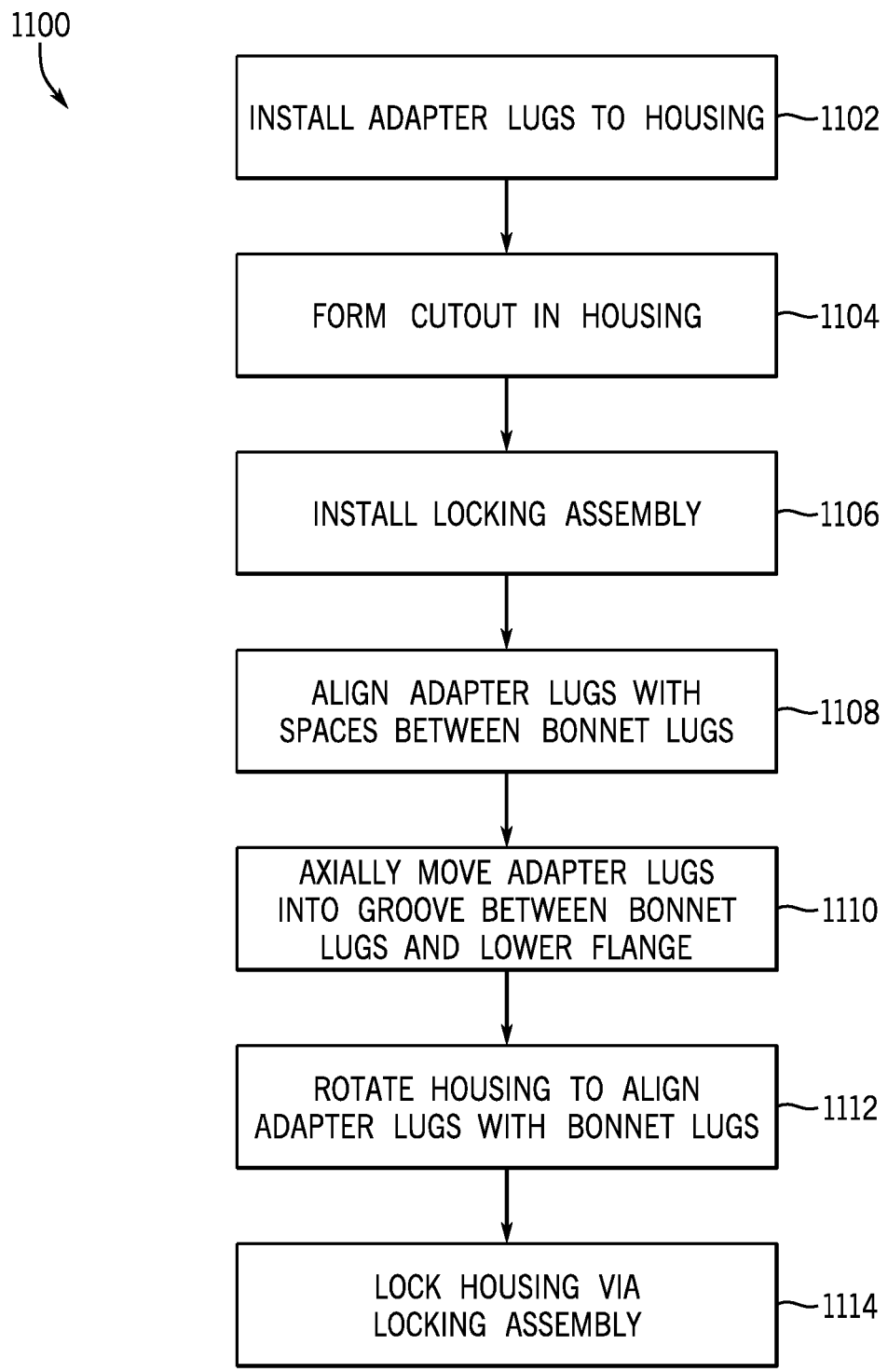
FIG. 11 is a flow chart of an embodiment of a method for coupling an actuator housing to a bonnet, in accordance with embodiments of the present disclosure.

FIG. 11 is a flow chart of an embodiment of a method 1100 for coupling a valve assembly together via a quick connect fitting. It should be appreciated that for this method and other methods described herein that there may be more or fewer steps. Furthermore, the steps may be performed in any order or in parallel, unless otherwise specifically stated. In this example, adapter lugs are installed to a housing 1102. For example, the adapter lugs may be installed directly to the housing, for example utilizing existing boreholes, such as the embodiment illustrated in FIG. 9. Moreover, in various embodiments, an adapter ring may include the adapter lugs and be coupled to the housing. The method also includes forming a cutout in the housing 1104. In various embodiments, the cutout may be utilized for a locking assembly that blocks rotational movement of the housing relative to a bonnet. In various embodiments, the cutout may be in the housing and/or extend to the adapter ring, in examples where the adapter ring is used. The locking assembly is installed 1106. For example, the locking assembly may include a variety of components, such as a latch and a locking lug that may be utilized to block rotational movement of the housing while in a locked position and to enable rotation of the housing relative to the bonnet while in an unlocked position. In this manner, a housing may be converted into a quick connect type housing, which may be utilized with a bonnet having bonnet lugs.

In various embodiments, the adapter lugs are aligned with spaces arranged between bonnet lugs of the bonnet 1108. In various embodiments, the spaces may have a circumferential distance that is greater than a circumferential distance of the adapter lugs, thereby enabling axial movement of the adapter lugs through the spaces 1110. Movement of the adapter lugs through the spaces may position the adapter lugs into a groove formed by a lower flange and the bonnet lugs. While in the groove, the housing may freely rotate. For example, the housing may be rotated to align the adapter lugs with the bonnet lugs 1112. Alignment of the respective lugs may block axial movement of the housing relative to the bonnet. For example, an axial force applied to the housing would drive the adapter lugs into the bonnet lugs, blocking movement of the housing. In various embodiments, the housing is locked into position via the locking assembly 1114. The lock may extend into the housing to position a barrier or interference between the bonnet lugs, thereby blocking rotational movement of the housing relative to the bonnet. As a result, the converted housing may be utilized as a quick connect housing.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

What is claimed is:

1. A valve assembly coupling system, comprising:
   an actuator for moving a valve between an open position and a closed position, comprising:
   a housing forming a chamber therein, the housing extending from a first end to a second end;
   an actuator assembly at the first end, the actuator assembly translating fluid pressure into a driving force;
   a stem coupled to the actuator assembly and extending through the actuator; and
   an adapter ring coupled to the second end, the adapter ring including a plurality of integrally formed adapter lugs extending radially inward toward the stem, the adapter lugs being circumferentially distributed about an inner diameter of the adapter ring and including a plurality of spaces between adjacent adapter lugs;
   a bonnet configured to be coupled to the adapter ring without threads comprising:
   a lower flange, at least a portion of the adapter ring overlapping the lower flange; and
   a plurality of bonnet lugs positioned axially higher than the lower flange, the plurality of bonnet lugs being circumferentially distributed about a circumference of the bonnet and including a plurality of bonnet spaces between adjacent bonnet lugs; and
   a groove between the lower flange and the plurality of bonnet lugs; and
   a locking assembly positioned at least partially within the housing, the locking assembly blocking rotational movement of the housing relative to the bonnet when in a locked position, the locking assembly comprising:
   an axially translatable latch, the axially translatable latch positioned within a cutout formed at least partially in the housing;
   a shaft coupled to the axially translatable latch and extending radially inward toward the bonnet; and
   a locking lug coupled to the shaft, wherein the locking lug is aligned with a bonnet lug of the plurality of bonnet lugs when in the locked position.

2. The valve assembly coupling system of claim 1, wherein the adapter ring is coupled to the housing via one or more connectors, the one or more connectors extending through apertures formed in the housing and the adapter ring.

3. The valve assembly coupling system of claim 1, wherein the adapter ring includes a shoulder that receives the second end of the housing.

4. The valve assembly coupling system of claim 1, wherein a first size of the plurality of adapter lugs is less than a second size of the plurality of bonnet spaces such that the plurality of adapter lugs can axially translate through the plurality of bonnet spaces.

5. The valve assembly coupling system of claim 1, wherein the housing is rotatable with respect to the bonnet and rotation of the housing axially aligns at least one adapter lug of the plurality of adapter lugs with at least one bonnet lug of the plurality of bonnet lugs.

6. A valve assembly coupling system, comprising:
   an actuator housing having a plurality of adapter lugs extending radially inward toward an axis, each adapter lug of the plurality of adapter lugs secured to the housing via a respective connector and each respective connector extending through the actuator housing; and
   a bonnet having a plurality of bonnet lugs extending radially outward away from the axis, each bonnet lug of the plurality of bonnet lugs being separated by a respective space, the space being sized to permit axial movement of an adapter lug of the plurality of adapter lugs toward a lower flange arranged axially lower than the plurality of bonnet lugs.

7. The valve assembly coupling system of claim 6, further comprising:
   a locking assembly blocking rotational movement of the housing relative to the bonnet when in a locked position.

8. The valve assembly coupling system of claim 7, wherein the locking assembly comprises:
   an axially translatable latch, the latch positioned within a cutout formed at least partially in the housing;
   a shaft coupled to the latch and extending radially inward toward the bonnet; and
   a locking lug coupled to the shaft, wherein the locking lug is aligned with a bonnet lug of the plurality of bonnet lugs when in the locked position.

9. The valve assembly coupling system of claim 6, wherein the bonnet lugs are part of a bonnet adapter, the bonnet adapter being coupled to the bonnet.

10. The valve assembly coupling system of claim 6, further comprising:
    an adapter ring coupled to a lower end of the housing, the adapter ring comprising an extension member including a plurality of holes that align with respective apertures of the housing when the adapter ring is coupled to the lower end.

11. The valve assembly coupling system of claim 10, wherein the plurality of adapter lugs are coupled to the adapter ring.

12. The valve assembly coupling system of claim 6, wherein the housing is rotatable with respect to the bonnet and rotation of the housing axially aligns at least one adapter lug of the plurality of adapter lugs with at least one bonnet lug of the plurality of bonnet lugs.

13. The valve assembly coupling system of claim 6, wherein a first size of the plurality of adapter lugs is less than a second size of the space such that the plurality of adapter lugs can axially translate through the plurality of bonnet spaces.

14. The valve assembly coupling system of claim 6, further comprising:
    a groove formed between the plurality of bonnet lugs and the lower flange, the groove receiving the plurality of adapter lugs after the plurality of adapter lugs axially move past the plurality of bonnet lugs.

15. A method for coupling components of a valve assembly, comprising:
    securing an adapter ring to an actuator housing, the adapter including a plurality of adapter lugs extending radially inward away from an exterior surface of the actuator housing, the adapter ring being secured to the actuator housing via connectors extending through the actuator housing;
    aligning an adapter lug of the plurality of adapter lugs with a space formed between a pair of bonnet lugs, the bonnet lugs being formed on a bonnet to extend radially outward toward the actuator housing;

axially lowering the actuator housing to translate the adapter lug below the pair of bonnet lugs through the space;
rotating the actuator housing to align the adapter lug with at least one bonnet lug; and
locking the actuator housing in position to block rotation of the actuator housing via a locking mechanism that extends, at least partially, into the space.

16. The method of claim 15, further comprising:
coupling the adapter lug to the actuator housing via a connector extending through an aperture formed in the actuator housing.

17. The method of claim 15, wherein axially lowering the actuator housing comprises:
positioning the adapter lug within a groove formed between the pair of bonnet lugs and a lower flange.

18. The method of claim 15, wherein locking the actuator housing in position comprises:
positioning a locking lug proximate a bonnet lug, the locking lug contacting the bonnet lug when a rotational force is applied to the actuator housing.

\* \* \* \* \*